(12) United States Patent
Nakamura et al.

(10) Patent No.: US 6,641,763 B2
(45) Date of Patent: Nov. 4, 2003

(54) FIBROUS AGGREGATE FORMING METHOD

(75) Inventors: Masao Nakamura, Nagoya (JP);
Tetsuya Hase, Nagoya (JP); Haruo Morita, Nagoya (JP); Hajime Yamamoto, Yokohama (JP); Eiichiro Shimizu, Yokohama (JP); Kenta Udagawa, Kawasaki (JP); Kenji Kitabatake, Kawasaki (JP)

(73) Assignees: Inoac Corporation, Aichi-ken (JP);
Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 09/829,916

(22) Filed: Apr. 11, 2001

(65) Prior Publication Data

US 2002/0006509 A1 Jan. 17, 2002

(30) Foreign Application Priority Data

Apr. 13, 2000 (JP) ......................... 2000/111846
Mar. 15, 2001 (JP) ......................... 2001/074071

(51) Int. Cl.[7] ........................... B29B 11/12; B29C 35/16
(52) U.S. Cl. ..................... 264/122; 264/126; 264/113
(58) Field of Search ................................ 264/109–128

(56) References Cited

U.S. PATENT DOCUMENTS 3,554,826 A   1/1971  Macaluso ................... 156/82
4,068,036 A * 1/1978  Stanistreet ................. 156/306
4,359,445 A * 11/1982 Kane et al. ................. 264/168
5,169,580 A   12/1992 Marcus ...................... 264/115

FOREIGN PATENT DOCUMENTS

| EP | 0 567 921 | 11/1993 |
| EP | 0 672 771 | 9/1995 |
| EP | 0 879 911 | 11/1998 |
| EP | 0 896 079 | 2/1999 |
| JP | 06-234197 | 8/1994 |
| JP | 07-290475 | 11/1995 |
| JP | 09-248873 | 9/1997 |
| JP | 11-076650 | 3/1999 |
| WO | WO 96/41047 | 12/1996 |
| WO | WO 98/24958 | 6/1998 |

* cited by examiner

Primary Examiner—Stephen J. Lechert, Jr.
(74) Attorney, Agent, or Firm—Fitzpatrick, Cella, Harper & Scinto

(57) ABSTRACT

A forming method for a fiber aggregate in which fibers are heated to be welded with each other includes a heating step of applying upward heated air to a bottom of a block of the fibers to pass the heated air therethrough and to cause the block of fibers to float, wherein at least parts of fibers are melted while the block of fibers float, and a compression step of compressing substantially in a vertical direction the heated block of fibers into a desired height. The compressed block of fibers is cooled to solidify melted portions of the fibers at portions where the fibers intersect with each other.

17 Claims, 9 Drawing Sheets

FIBROUS AGGREGATE FORMING METHOD

FIELD OF THE INVENTION AND RELATED ART

The present invention relates to a fibrous aggregate formed by processing fibrous material comprising fibers in particular, a fibrous aggregate which is relatively low in density and is relatively thick. It also relates to a thermal method for forming such a fibrous aggregate, and an apparatus for forming such a fibrous aggregate.

Conventional methods for forming a fibrous aggregate, which are widely in use, may generally be classified into two groups: the needle punching group and the thermal group. In certain cases, a needle punching method and a thermal method are independently used, whereas in other cases, they are used in combination.

Next, the two groups of fibrous aggregate forming methods will be briefly described.

(1) Needle Punching Method

This is a method for continuously forming a sheet of fibrous aggregate by entangling fibers among themselves; multilayered fibrous material is reciprocally punched through with the use of a needle punching machine which uses a needle called a felting needle.

(2) Thermal Method

This is a method for forming a fibrous aggregate by thermally welding fibers among themselves; a predetermined amount of heat is applied to multilayered fibrous material comprising plural types of fibers different in melting point, so that the fibers with the lower melting point (bonding material) melt and weld the fibers with the higher melting point (structural material), at the intersections of the fibers with the higher melting point. In other words, according to a thermal method, the fibers with the higher melting point serve as structural material, whereas fibers with the lower melting point serve as bonding agent. As for typical thermal methods, there are a method called a heated air conveyer heating chamber method, in which multilayered fibrous material is continuously fed into a heated air conveyer heating chamber to form a continuous form of fibrous aggregate, a method called a molding method, or a batch method, in which multilayered fibrous material is packed into a mold of a predetermined size and is heated to form a block form of fibrous aggregate, which has a predetermined size (size and shape).

Next, the two methods will be described in more detail.

(2-a) Heated Air Conveyer heating chamber Method

FIG. 12 is a schematic sectional view of a conventional heated air conveyer heating chamber used for a thermal fibrous aggregate forming method. As is evident from FIG. 12, this heated air conveyer heating chamber 500 has a pair of mesh belts 510 and 520, which are placed in a manner to vertically oppose each other, with the provision of a predetermined gap between the two belts, in order to move the multilayered fibrous material 600, in the leftward direction of the drawing, while compressing the multilayered fibrous material 600 from the top and bottom sides (in the direction in which the fibers are stacked), as the multilayered fibrous material 600 is fed from the upper right direction of the drawing. The multilayered fibrous material 600 is actually layers of webs of sheathed fiber. Each web has been produced with the use of a carding machine (unillustrated), a cross-laying machine (unillustrated), or the like, and the fibers in each web have been laid more or less in parallel. The weight per unit of area of the multilayered fibrous material 600 is selected in accordance with its usage. Further, the multilayered fibrous material 600 comprises plural types of fibers different in melting points.

The distance between the two mesh belts 510 and 520 is approximately equal to the thickness of the final product, or a continuous fibrous aggregate 650, and can be adjusted as necessary. The thickness H of the continuous multilayered fibrous material 600 fed into the heated air conveyer heating chamber 500 is greater that the gap h between the two mesh belts 510 and 520. After being fed into the heated air conveyer heating chamber 500, the continuous multilayered fibrous material 600 is compressed all at once to the thickness h by the mesh belt 510 and 520, and is thermally formed into the continuous fibrous aggregate 650 while remaining in the compressed state.

In order to thermally form the continuous multilayered fibrous material 600 into a continuous fibrous aggregate 650, an air sending chamber 530 for blowing air, and an air receiving chamber 540 for suctioning the heated air blown out of the air sending chamber 530, are provided in the heated air conveyer heating chamber 500. The air sending chamber 530 is provided with an air supplying hole 531 and a plurality of perforations, and is located above the path of the multilayered fibrous material 600, within the heated air conveyer heating chamber 500. Heated air is blown into the air sending chamber 530 through the air supplying hole 531, and is blown out of the air sending chamber 530 through the plurality of perforations 532 to be blown at the multilayered fibrous material 600. The air receiving chamber 540 is located below the path of the multilayered fibrous material 600, and is provided with a plurality of perforations 542 and a plurality of air suctioning holes 541. As the heated air having been blown at the multilayered fibrous material 600 from the air sending chamber 530, as described above, passes through the multilayered fibrous material 600, the heated air is suctioned into the air receiving chamber 540 through the plurality of perforations 542, and is exhausted through the plurality of air suctioning holes 541.

Upon being introduced into the heated air conveyer heating chamber 500, the continuous multilayered fibrous material 600 is heated by the heated air blown out of the air sending chamber 530 until its temperature rises to a predetermined one. As described above, the continuous multilayered fibrous material 600 is continuous layers of plural types of fibers different in melting point. Therefore, the fibers, which have a relatively lower melting point, can be melted by setting the temperature of the heated air to a temperature which is higher than the melting point of the fibers with a relatively lower melting point, and is lower than the melting point of the fibers with a relatively higher melting point, so that the fibers with the relatively higher melting point, can be bonded among each other at their intersections, with the melted fibers with the lower melting point acting as bonding agent, to effect a continuous fibrous aggregate 650, which has a predetermined thickness.

(2-b) Mold Based Method

FIG. 13 is a drawing for depicting one of conventional methods for forming a fibrous aggregate. A block of multilayered fibrous material 610 is identical in material to the continuous multilayered fibrous material 600 used in the heated air conveyer heating chamber based method, except that it is in the form of a block. More specifically, as shown in FIG. 13(a), the multilayered fibrous material block 610 comprises several layers of fibers, in which fibers are aligned approximately in parallel in a certain direction a, and which are stacked in a direction b perpendicular to the direction in which the fibers are aligned in each layer. This multilayered fibrous material block 610 is placed in an aluminum mold 700, and is covered with a lid 710 as shown in FIGS. 13(b) and (c). At this stage, the multilayered fibrous material block 610 in the mold 700 has been simply compressed in the stacking direction b, in the mold 700. Then, a block of fibrous aggregate is obtained by heating the mold 700 until the aforementioned condition is satisfied.

However, the above described methods for forming a fibrous aggregate block have such problems of their own that will be described below.

(1) Needle Punching Method

A needle punching method physically causes fibers to entangle, with the use of a felting needle. Therefore, a fibrous aggregate produced by a needle punching method is hard, thin, and high in bulk density. In other words, a soft and thick fibrous aggregate which is low in bulk density is difficult to produce using a needle punching method.

(2a) Heated Air Conveyer heating chamber Based Method

In a heated air conveyer heating chamber based method, heated air is blown at multilayered fibrous material from above, and therefore, the fibers in the layers on the top side tend to soften before those in the layers on the bottom side. As a result, the layers on the top side tend to be collapsed by the pressure from the heated air from above, and also the self-weight of the layers of fibers, causing the layers on the top side to become higher in bulk density than the layers on the bottom side. In other words, it is difficult to produce a fibrous aggregate uniform in density using a heated air conveyer heating chamber based method. One of the solutions to this problem is to reduce the velocity of the heated air. However, reducing the heat air velocity makes it impossible for the heated air to pass through the multilayered fibrous material, creating a problem in that it is virtually impossible to heat the bottom portion of the multilayered fibrous material.

Therefore, producing a soft and thick fibrous aggregate which is low and uniform in bulk density using a heated air conveyer heating chamber based method is as difficult as producing it using a needle punching method, admitting that a relatively hard sheet of fibrous aggregate which is relatively high in bulk density can be as easily produced by the latter method as the former method. In addition, the layered fibrous material is heated while being kept in the compressed state by the mesh conveyer, and therefore, there is a problem in that the pattern (ridges and recesses) of the mesh conveyer is imprinted onto the surface layer of the multilayered fibrous material.

(2b) Mold Based Method

Referring to FIG. 14, the problems associated with methods for forming a fibrous aggregate using a mold will be described. FIG. 14 is a drawing for depicting the state of the inside of a mold during the production of a fibrous aggregate using a mold.

As the mold 700 begins to be heated after the multilayered fibrous material block 610 is packed into the mold 700 and the mold 700 is sealed with the lid 710, the multilayered fibrous material block 610 begins to gradually collapse in the gravity direction starting from its fringe. This phenomenon is not conspicuous when the plural types of fibers in the multilayered fibrous material block 610 are very different in melting point, for example, when one group of of fibers in the multilayered fibrous material block 610 is formed of polyethylene, and the other group of fibers is formed of polypropylene-terephthalate. However, if the two groups of fibers are selected from among olefinic materials alone, the phenomenon becomes very conspicuous. This may be due to the fact that in this case, there is little difference in melting point between the two groups of fibers, and therefore, the effects of the heat transmitted from the mold 700 first manifest in the fringe portions of the multilayered fibrous material block 610.

As the heating of the mold 700 is continued, heat is conducted all the way to the center of the multilayered fibrous material block 610, causing the entirety of the adjacencies of the bottom surface of the multilayered fibrous material block 610 to collapse as shown in FIG. 14(b). When the multilayered fibrous material block 610 is in this state, the bulk density of the multilayered fibrous material block 610 is nonuniform in terms of the gravity direction; the top portion of the multilayered fibrous material block 610 is lower in bulk density than the bottom portion of the multilayered fibrous material block 610 because the bottom side of the multilayered fibrous material block 610 is more affected by the weight of the multilayered fibrous material block 610 itself. In other words, a high bulk density region 610a and a low bulk density region 610b coexist in the multilayered fibrous material block 610; an undesirable bulk density gradient has been created.

As described before, in the case of a conventional mold based method, bulk density gradient occurs, and therefore, a fibrous aggregate block which is relatively high in hardness and bulk density, such as the one formable by a conventional heated air conveyer heating chamber based method, can be easily formed, but a soft and thick fibrous aggregate block which is uniform and low in bulk density is difficult to produce.

Further, across the portions of the internal surface of the mold 700, with which the fibers come into contact, melted fibers (fibers which have the relatively low melting point and act as bonding agent) spread flat. As a result, a porous skin, which is smaller in porosity than the internal portion of the multilayered fibrous material block 610, is formed in a manner to wrap the multilayered fibrous material block 610 along the internal surface of the mold 700. Depending upon the type of fibrous aggregate usage, the presence of this skin is undesirable, and therefore, a process for removing the skin becomes necessary, which is a problem in that the removal of the skin reduces yield relative to the amount of raw material.

SUMMARY OF THE INVENTION

The primary object of the present invention is to provide a method and an apparatus which are capable of forming a thicker fibrous aggregate which is low and uniform in bulk density, in particular, a method and an apparatus which are capable of forming such a fibrous aggregate even when the fibers in the multilayered fibrous material used for the formation of a fibrous aggregate are the same in properties, are not very different in melting point, and/or are relatively low in melting point.

A fibrous aggregate forming method in accordance with the present invention for accomplishing the above described objects is a method for thermally processing fibrous material to form a fibrous aggregate, and comprises: a heating process in which heated air is blown upward through the fibrous material from below the fibrous material to melt at least a portion of each fiber of the predetermined group of fibers in the fibrous material, while keeping the fibrous material afloat and in the same state as it was prior to the blowing of the heated air; a compressing process in which the heated fibrous material is compressed to a desired thickness from the top and bottom sides; and a cooling process in which the fibrous material is cooled to solidify the melted portion of each fiber, so that the fibers are firmly welded to each other at their intersections.

A fibrous aggregate forming apparatus in accordance with the present invention is an apparatus for thermally processing a fibrous material to form a fibrous aggregate, and comprises: a supporting means on which the aforementioned fibrous material is mounted; a heated air flow generating means for blowing the heated air for the heating process for melting at least a portion of each fiber, upward from below the fibrous material to lift and keep afloat the fibrous material from the supporting means; a compressing means for compressing the fibrous material toward the supporting means; and an attitude controlling means for controlling the attitude of the fibrous material kept afloat by the heated air.

According to one of the aspects of the present invention, while the fibrous material is thermally processed, it is lifted and kept afloat by blowing heated air upward at the fibrous material from directly below the fibrous material, and the attitude of the fibrous material kept afloat is regulated. As a result, the effect of the gravity which affects formation of fibrous aggregate is eliminated, and therefore, relatively thick fibrous aggregate which is relatively low in bulk density can be easily obtained.

In particular, a ventilatory sheet is placed in contact with the top and bottom surfaces of the fibrous material, and therefore, the surface pattern of the members used to compress the fibrous material is not imprinted onto the skin layer, or the top layer, of the fibrous material.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Next, the preferred embodiments of the present invention will be described with reference to the appended drawings.

Embodiment 1

Figure 1:
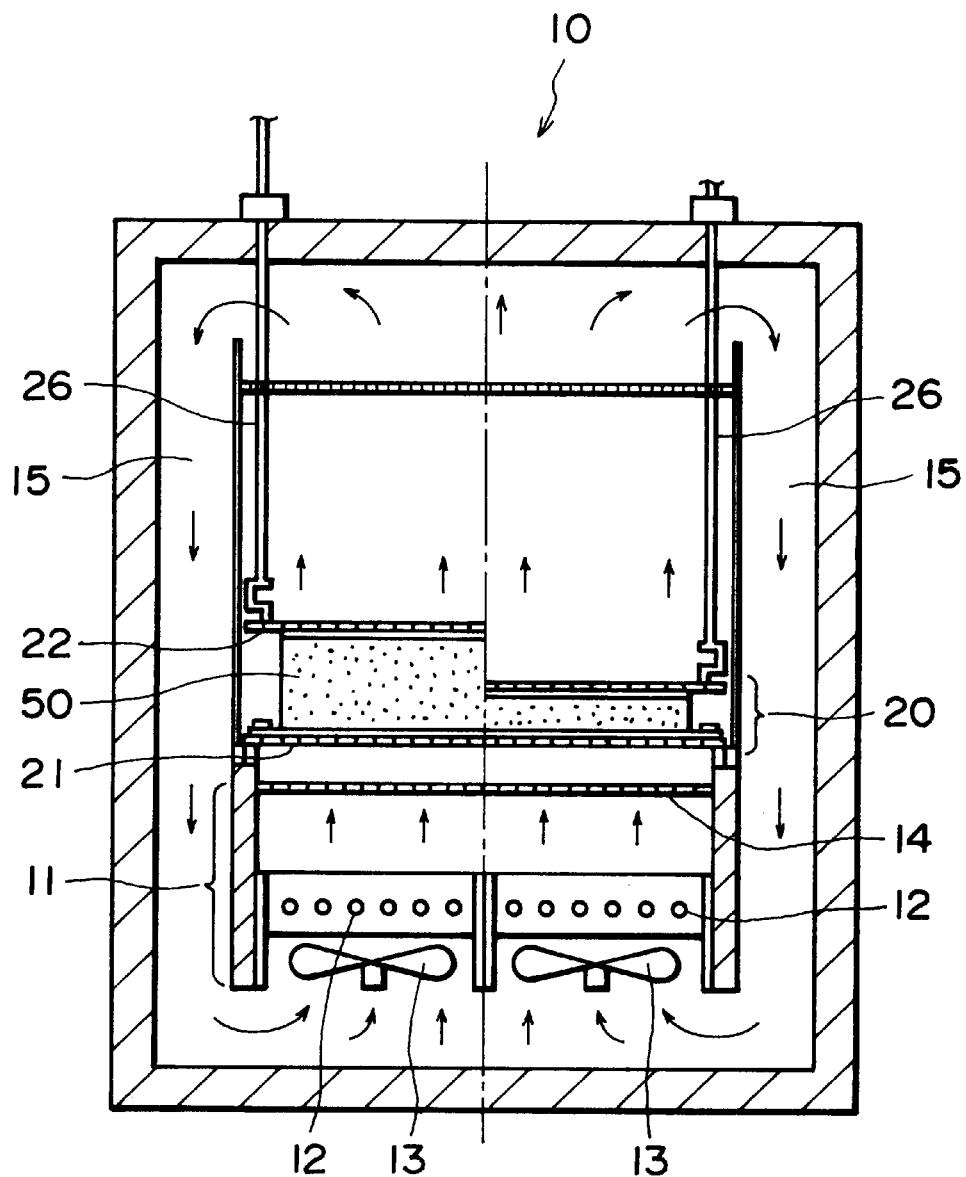
FIG. 1 is a schematic sectional view of the heating chamber for forming a fibrous aggregate, in the first embodiment of the present invention.

FIG. 1 is a schematic sectional view of the heating chamber for forming a fibrous aggregate, in the first embodiment of the present invention.

The heating chamber 10 depicted in FIG. 1 contains a heated air flow generating unit 11 for generating a flow of heating air. The heated air flow generating unit 11 is located in the bottom portion of the heating chamber 10, and has: a plurality of heating rods 12 for generating heat; an air blowing fan 13 which is located below the heating rods 12 to generate upward heated air flow; and a perforated stainless steel plate 14 located above the heater 12. With this structural arrangement, as the air within the heating chamber 10 is blown upward by the air blowing fan 13, and is heated by the heating rods 12. Then, the heated air flow is uniformly diffused as it is passes through the perforated plate 14. After passing through the perforated plate 14, the heated air hits the top wall of the heating chamber, moves downward through a return path 15 and is suctioned by the air blowing fan 13, being again blown upward to circulate through the heating chamber 10. The internal temperature of the heating chamber 10 is kept constant by an unillustrated controlling means.

Located above the heated air flow generating unit 11 is a molding unit 20 which holds a block 50 of multilayered fibrous material from the top and bottom sides. The molding unit 20 has top and bottom dies 22 and 21, which are structured so that they can be placed in, or removed from, the heating chamber 10, independently of each other. The top die 22 is supported by a top die guide 26 which can be moved upward or downward by an unillustrated driving means, so that the top die 22 can be moved up or down in the heating chamber 10. The left half of FIG. 1 shows the state in which the top die 22 has been moved upward, whereas the right half shows the state in which the top die 22 has been moved downward. The top and bottom dies 22 and 21 are structured so that heated air can be passed upward through them as will be described later, and also so that they do not deform when compressing the multilayered fibrous material 50. Therefore, the top and bottom dies 22 and 21 are perforated stainless steel plates.

Here, the multilayered fibrous material 50 will be described. The multilayered fibrous material 50 is a block of multilayered webs of fibers, and the fibers are extended more or less in parallel. It is produced using a carding machine (unillustrated), a cross-layer machine (unillustrated), or the like. The weight per unit of area, of the multilayered fibrous material 50 is determined depending on the usage of the finished product. It is given a predetermined size. The direction in which the webs are stacked is parallel to the gravity direction, and coincides with the vertical direction in FIG. 1. The direction in which fibers are extended is approximately perpendicular to the direction in which the webs are stacked, and coincides with the left-to-right direction, or the front-to-rear direction, in FIG. 1. In this embodiment, a large sheet of multilayered fibrous material, which is produced using the aforementioned carding machine, a cross-laying machine, or the like, is cut into approximately square pieces having a dimension of an approximately 1,000 mm×approximately 1,000 mm, and these pieces are used as the multilayered fibrous material blocks 50. It should be noted here that it is not always necessary that the multilayered fibrous material 50 is directional; the fibers in the multilayered fibrous material 50 may extend in random directions. The bulk density of the multilayered fibrous material 50 is desired to be approximately uniform.

Figure 2:
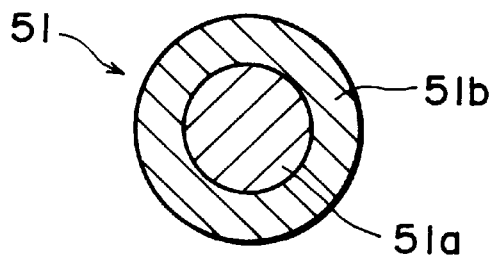
FIG. 2 is a sectional view of an example of a strand of fiber in the fibrous material in accordance with the present invention.

As for the material for the fibers 51 in the multilayered fibrous material 50, a type of fiber structured of two portions: core portion 51*a* of polypropylene, and sheath portion 51*b* of polyethylene which sheaths the core portion 51*a*, as shown in FIG. 2, is used as the fiber in this embodiment (hereinafter, sheathed fiber). The melting point of polypropylene is approximately 180° C., and the melting point of polyethylene is approximately 130° C. Therefore, the difference in melting point between the two materials is approximate 50° C. As for fiber diameter, fiber with a diameter of 5 $\mu$m to 50 $\mu$m is generally used. In this embodiment, fiber with a diameter of approximately 18 $\mu$m (2 deniers) is used.

Although the above described sheathed fiber 51 is used in this embodiment, the fiber structure does not need to be limited to this structure. For example, a blend between pure polypropylene fiber and pure polyethylene fiber, or a blend between sheathed fiber formed of polypropylene and polyethylene, and pure fiber, may be used. When the sheathed fiber 51 is used, the polyethylene is present at all intersections among the fibers, and therefore, virtually all fibers are securely fixed to the fibers in contact with them, at their intersections. As a result, sturdy fibrous aggregate is produced. When a blend between polyethylene fibers and polypropylene fibers is used, the ratio at which the fibers are fixed to the fibers in contact with them, at their intersections, varies depending on the blending ratio between the polyethylene fibers and polypropylene fibers. In other words, the fiber fiber-to-fiber fixation occurs only at the intersections where a polyethylene fiber is in contact with another polyethylene fiber. Thus, employment of the above described blend is useful to obtain relatively soft fibrous aggregate. Further, even though polyethylene and polypropylene are used as the material for the fibrous aggregate in this embodiment, fiber selection is not limited to the one in this embodiment, as long as a plurality of selected fibers are different in melting point from each other. Further, the number of different fibers does not need to be two; it may be three or more.

Next, the fibrous aggregate forming method which uses the heating chamber 10 illustrated in FIG. 1 will be described with reference to a case in which fibrous aggregate with an apparent density of 0.038–0.043 g/cm$^3$ and a thickness of 35 mm is formed.

(1-1) Preparatory Process

In order to form fibrous aggregate with an apparent density of 0.038–0.043 g/cm$^3$ and a thickness of 35 mm using the aforementioned sheathed fibers, the thickness of the multilayered fibrous material block 50 after it is prepared, that is, after fiber stand webs are vertically stacked, are lightly compacted down, and are relieved of pressure, is desired to be approximately 120 mm (100–150 mm). In this embodiment, therefore, the multilayered fibrous material block 50 with a thickness of 120 mm was used.

Figure 3:
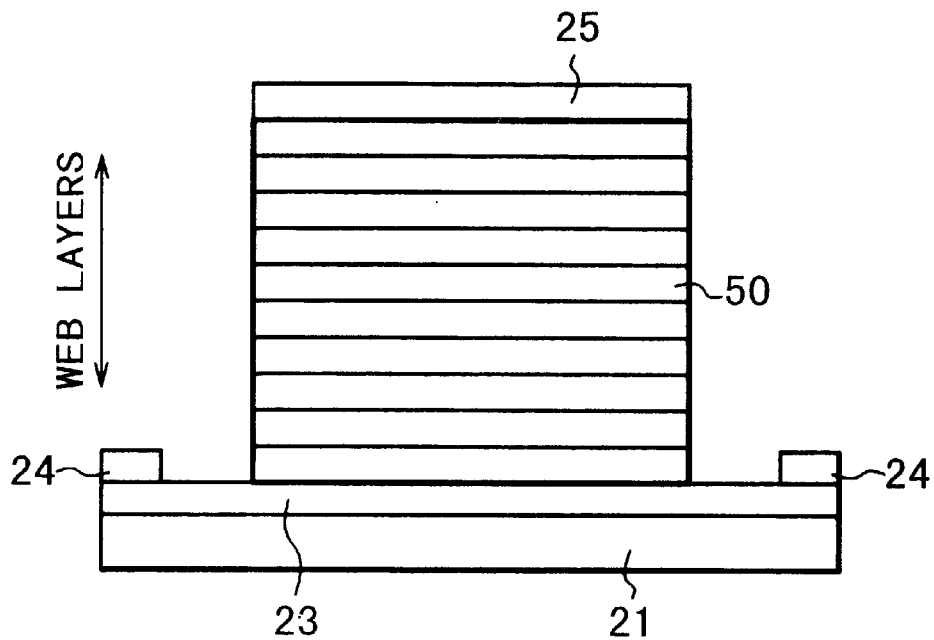
FIG. 3 is a schematic drawing for depicting a method for forming a block of fibrous aggregate using the heating chamber illustrated in FIG. 1, and shows the state in which the dies are placed in contact with the top and bottom surfaces of the multilayered fibrous material block, one for one.

Referring to FIG. 3, first, the bottom die 21 is removed from the heating chamber 10 (FIG. 1), and a ventilatory sheet 23 is spread on the bottom die 21. Then, the multilayered fibrous material block 50 is placed on the ventilatory sheet 23. The edge portions of the ventilatory sheet 23 are anchored to the bottom die 21 with weighting blocks 24. In order to assure that there will be a sufficient amount of margin used by the weighting blocks 24 to anchor the ventilatory sheet 23, and also in order to allow the ventilatory sheet 23 to float from the bottom die 21 during the heating process which will be described later, the size (size of the entirety of the surface on which multilayered fibrous material block 50 is placed) of the ventilatory sheet 23 is rendered sufficiently large compared to the size of the exact portion of the surface of the ventilatory sheet 23, on which the multilayered fibrous material block 50 is placed.

On the top surface of the multilayered fibrous material block 50, a ventilatory sheet 25 similar to the ventilatory sheet 23 is placed. The size of this ventilatory sheet 25 is approximately the same as the size of the top surface of the multilayered fibrous material block 50. Of the two ventilatory sheets 23 and 25, the bottom ventilatory sheet 23 is required to retain the multilayered fibrous material block 50 during the heating process which will be described later, and therefore, it is required that the ventilatory sheet 23 is capable of sufficiently engaging or entangling with the fibers of the multilayered fibrous material block 50, and also capable of stretching or shrinking in an environment in which heat is applied. If the fibers of the multilayered fibrous material block 50 do not entangle with the ventilatory sheet 23, when the multilayered fibrous material block 50 is made to float, it becomes separated from the ventilatory sheet 23; the ventilatory sheet 23 fails to remain in contact with the multilayered fibrous material block 50.

On the other hand, the top die 22 (FIG. 1) has been set in advance in the heating chamber 10. In this state, it is desired that the top die 22 has been heated to a predetermined internal temperature of heating chamber 10, which will be described later. If the temperature of the top die 22 is too low, the fibers are rapidly cooled and solidify, making it impossible to uniformly compress the multilayered fibrous material block 50, as the top die 22 comes into contact with the multilayered fibrous material block 50 in the compressing process which will be described later.

(1-2) Heating Process

Figure 4:
FIG. 4 is a schematic drawing for depicting a method for forming a block of fibrous aggregate using the heating chamber illustrated in FIG. 1, and shows the positional relationship between the bottom mold set in the heating chamber, and the top mold.
Figure 4:
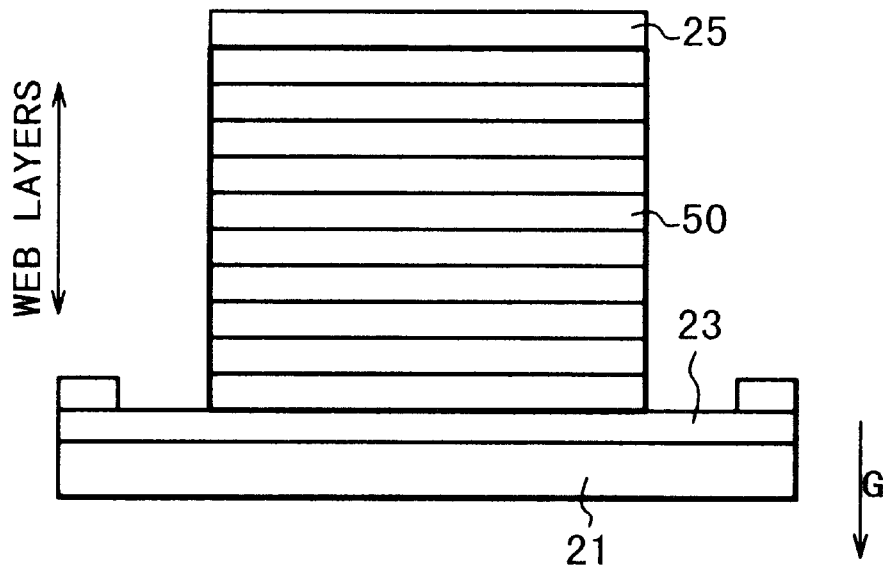

After the multilayered fibrous material block 50 is mounted on the bottom die 21 as described above, the bottom die 21 on which the multilayered fibrous material block 50 is mounted is set in the heating heating chamber 10. At this stage, the position of the top die 22 is such that as the multilayered fibrous material block 50 is set in the heating heating chamber 10, a gap is created between the multilayered fibrous material block 50 and the top die 22, as shown in FIG. 4. Further, the interior of the heating heating chamber 10 has been heated in advance to a desirable temperature. As described before, the multilayered fibrous material block 50 is formed of the aforementioned sheathed fiber, that is, fiber having core and sheath portions formed of polypropylene and polyethylene, respectively, and therefore, the temperature to which the interior of the heating heating chamber 10 is to be heated has only to be between the melting point (approximately 130° C.) of the polyethylene and the melting point (approximately 180° C.) of polypropylene, and also higher than the softening point (approximately 120° C.) of the polypropylene. In this embodiment, the interior of the heating heating chamber 10 was set to 140° C.

After setting the bottom die 21 in the heating heating chamber 10, the air blowing fan 13 is driven to blow heated air toward the multilayered fibrous material block 50 from below the multilayered fibrous material block 50 to heat the multilayered fibrous material block 50. The air blowing fan 13 is set so that the velocity of the upward air flow generated by the air blowing fan 13 becomes 0.3–0.8 m/sec. As described before, the bottom and top dies 21 and 22 are formed of perforated plate, and the multilayered fibrous material block 50 is sandwiched by the top and bottom ventilatory sheets 23 and 25. Therefore, the heated air is more uniformly passed through the multilayered fibrous material block 50. Incidentally, in order to prevent the bottom and top dies 21 and 22 from interfering with the ventilatory performance of the ventilatory sheet 23 and 25, the sizes and densities of the perforations of the bottom and top dies 21 and 22 are selected so that the ventilatory performances of the bottom and top dies 21 and 22 become approximately the same as, or greater than, those of the ventilatory sheets 23 and 25. The air blowing fan 13 is driven to generate such a heated air flow that is capable of keeping the multilayered fibrous material block 50 afloat above the bottom die 21, against the gravity G, in such a manner that the multilayered fibrous material block 50 remains in contact with the top die 22 without being compressed thereby. In other words, the fibers themselves are kept afloat by the heated air from below, while the multilayered fibrous material block 50 is being held by the top die 21 by the top surface. Therefore, the effect of the gravity which affects each fiber is reduced. Further, the interposition of the ventilatory sheet 25 between the top surface of the multilayered fibrous material block 50 and the top die 22 prevents the bulk density of the top layer of the multilayered fibrous material block 50 from becoming locally high. In other words, with the provision of the above described heating arrangement, the multilayered fibrous material block 50 can be heated while keeping the multilayered fibrous material block 50 virtually before heating.

Figure 5:
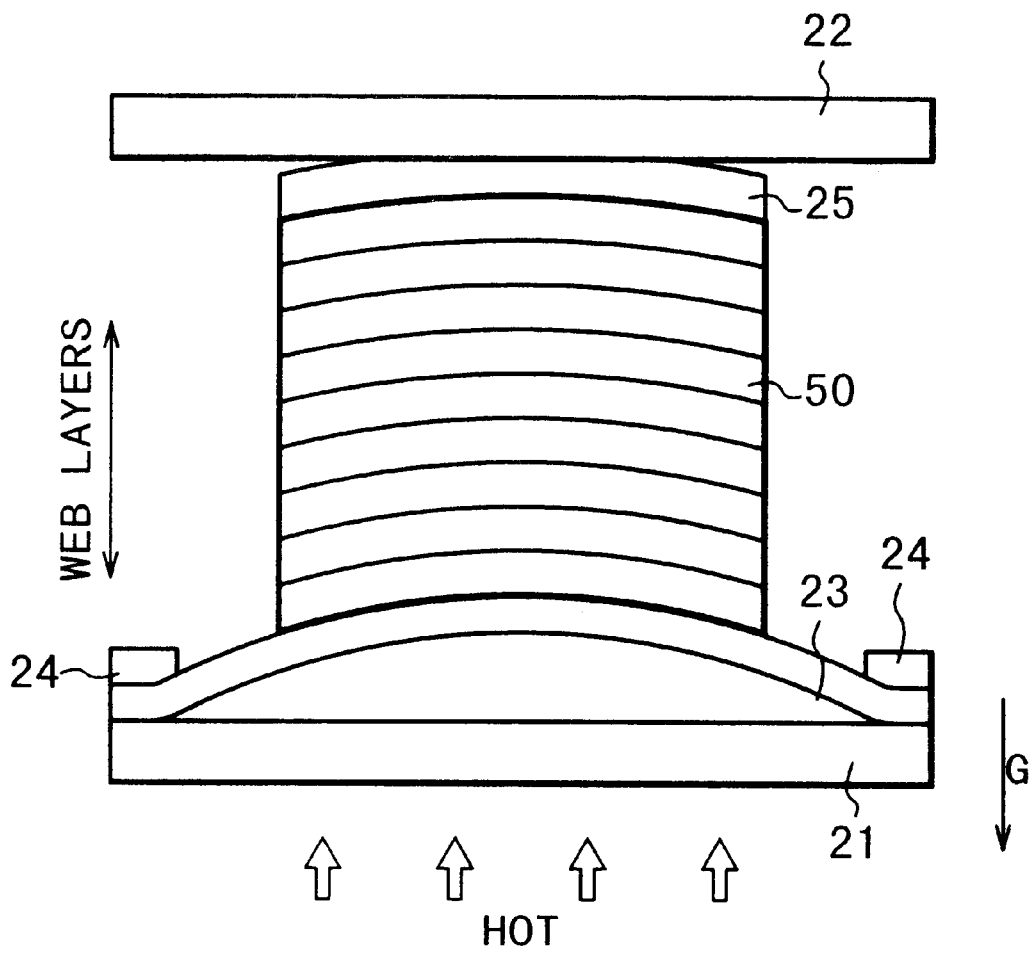
FIG. 5 is a schematic drawing for depicting a method for forming a block of fibrous aggregate using the heating chamber illustrated in FIG. 1, and shows the state in which heated air is being blown at the multilayered fibrous material from below.

As described above, the multilayered fibrous material block 50 is caused to float by the heated air. However, the fiber stands of the multilayered fibrous material block 50 have sufficiently entangled with the ventilatory sheet 23, and further, the edge portions of the ventilatory sheet 23 are anchored to the bottom die 21 by the weighting blocks 24. Therefore, the ventilatory sheet 23 balloons as shown in FIG. 5; the amount of the lift of the multilayered fibrous material block 50 and the attitude of the multilayered fibrous material block 50 are regulated by the ventilatory sheet 23 as the multilayered fibrous material block 50 is lifted by the heated air. By regulating the position and attitude of the multilayered fibrous material block 50 while the multilayered fibrous material block 50 is kept afloat by the heated air, it is assured that the multilayered fibrous material block 50 is uniformly heated by the heated air.

If the weighting blocks 24 are not used, the following problems occur. That is, if the velocity of the heated air blown upward from directly below the multilayered fibrous material block 50 is excessively high, the multilayered fibrous material block 50 is pressed against the top die 22 with excessive force, and therefore, the bulk density of the top portion of the multilayered fibrous material block 50 becomes greater than that of the bottom portion of the multilayered fibrous material block 50. On the other hand, if the heated air velocity is excessively low, the multilayered fibrous material block 50 fails to be lifted, and the fibers softened by the heated air droop downward, causing the bulk density in the bottom portion of the multilayered fibrous material block 50 to become greater than that in the top portion of the multilayered fibrous material block 50. In either case, unless the heated air is blown upward at a proper velocity, the bulk density of the multilayered fibrous material block 50 will not turn out to be uniform after the heating. Incidentally, if it is possible to control the heated air velocity so that the multilayered fibrous material block 50 is lifted and kept afloat, and the entirety of the top surface of the multilayered fibrous material block 50 remains virtually evenly in contact with the top die 22 without causing the top portion of the multilayered fibrous material block 50 to be compressed against the top die 22, the weighting blocks 24 are not necessarily required.

Further, the ventilatory sheet 23 is entangled with the fibers of the multilayered fibrous material block 50 to a proper degree, which in turn increases the frictional resistance between the ventilatory sheet 23 and multilayered fibrous material block 50. Therefore, it is difficult for the multilayered fibrous material block 50 to horizontally shift relative to the ventilatory sheet 23. Thus, the multilayered fibrous material block 50 is prevented from being shifted, stretched, or compressed by external physical force during this heating process, compressing process, and cooling process. As a result, a block of fibrous aggregate uniform in density is produced.

Regarding the above described lifting and keeping afloat of the multilayered fibrous material block 50, at least the opposing two edge portions of the ventilatory sheet 23 placed in contact with the polygonal flat bottom surface of the multilayered fibrous material block 50 are prevented from lifting, by being anchored by the weighting blocks 24, and since the ventilatory sheet 23 is ballooned upward by the heated air, the multilayered fibrous material block 50 on the ventilatory sheet 23 is actually lifted and kept afloat from the bottom die 21. Therefore, the upward flow of the heated air is prevented from escaping from the lateral sides of the multilayered fibrous material block 50. As a result, the bulk density of the multilayered fibrous material block 50 remains as desirable as possible in terms of the horizontal direction as well as the vertical direction, that is, the direction of thickness, almost to the surfaces of the multilayered fibrous material block 50.

Figure 6:
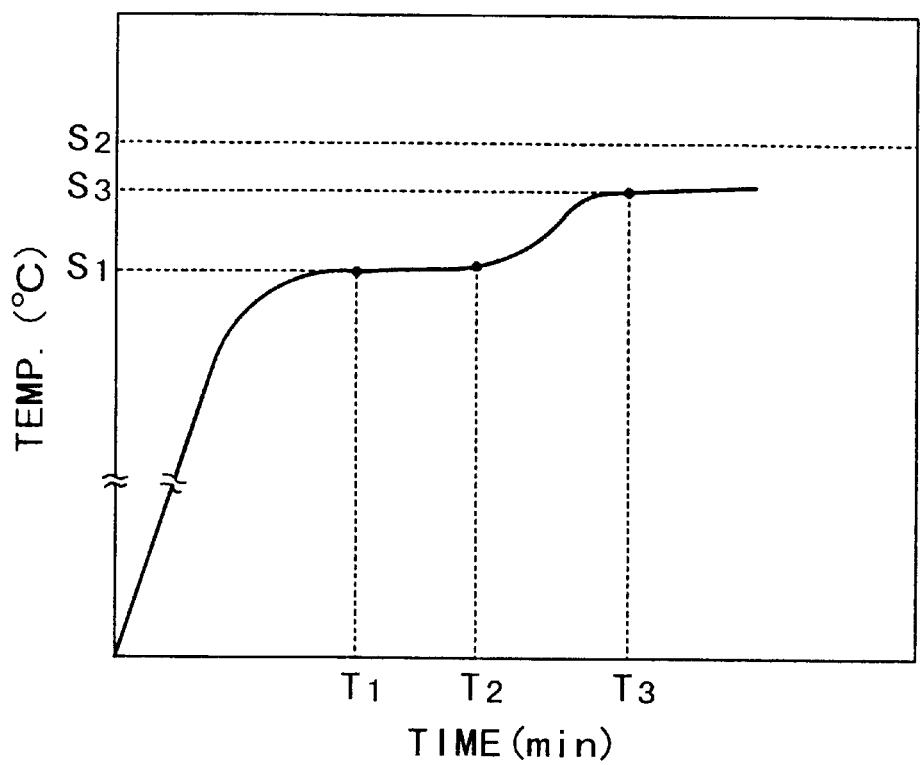
FIG. 6 is a graph which shows the characteristic, in terms of temperature increase, of a block of multilayered fibrous material formed of such fiber that has a core portion and a sheath portion, which are formed of polypropylene and polyethylene, respectively.

At this time, the characteristic, in terms of temperature increase, of the multilayered fibrous material block 50 formed of such sheathed fiber that has a polypropylene core and a polyethylene sheath will be described. FIG. 6 is a graph which shows the characteristic of the multilayered fibrous material block 50 in terms of temperature increase. In FIG. 6, the axis of ordinates represents temperature, and the axis of abscissas represents elapsed heating time.

As the multilayered fibrous material block 50 is placed in the heating heating chamber 10 which has been heated to a target temperature of S3 which is lower than the melting point S2 (approximately 180° C.) of the polypropylene, the temperature of the multilayered fibrous material block 50 rises to the melting point S1 (approximately 130° C.) after the elapse of a time T1. As the temperature of the multilayered fibrous material block 50 reaches S1, the polyethylene begins to melt, and the temperature of the multilayered fibrous material block 50 remains at S1 until the polyethylene, that is, the material of the sheath portion, completely melts.

Then, after the passage of a time T2, that is, as the polyethylene completely melts, temperature of the multilayered fibrous material block 50 again begins to rise, and reaches the target temperature S3 of the heating chamber 10 after the elapse of a time T3. Since the temperature S3 has been set to be lower than the melting point S2 of the polypropylene, it does not occur that polypropylene melts and allows the structure of the multilayered fibrous material block 50 to collapse.

In the case of the multilayered fibrous material block 50 in this embodiment, the size of which is 1,000 mm×1,000 mm, the proper lengths of T1, T2, and T3 are 10–15 minutes, 10–20 minutes, and 20–25 minutes, correspondingly.

In this process, causing the fibrous material block 50 to float, is advantages irrespective of the use of the ventilatory sheet 23. If the fibrous material block 50 is not caused to float, the state of being heated is different between adjacent the opened portions and adjacent the closed portions of the die 21, which is the perforated plate of stainless steel in this embodiment. The heated air passes through the opened portions, and therefore, the portions adjacent the openings are more quickly heated with the result that the temperature distribution in the fibrous material block 50 is not uniform, and the produced fibrous material may be non-uniform. However, by causing the fibrous material block 50 to float as with this embodiment, there is provided a gap between the bottom die 21 and the bottom portion of the fibrous material block 50. The perforations and the gap function like a damper such that the hot air can relatively uniformly hit the bottom of the fibrous material block 50 to uniformly heat the block 50. Thus, a uniform fibrous material block can be produced.

(1-3) Compressing Process

Figure 7:
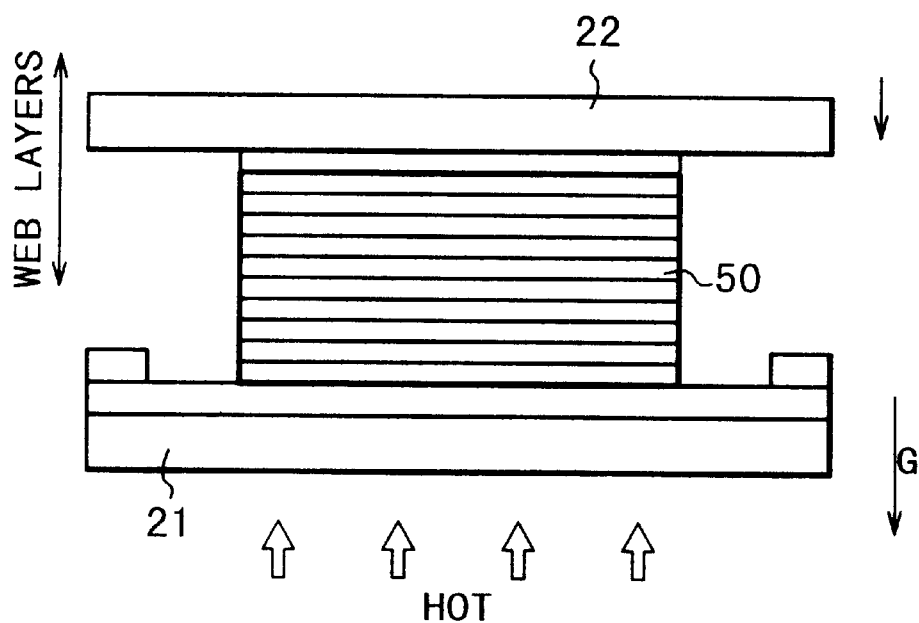
FIG. 7 is a schematic drawing for depicting a method for forming a block of fibrous aggregate using the heating chamber illustrated in FIG. 1, and shows the state in which the block of layers of fibers is being compressed by the top and bottom dies.

Referring to FIG. 7, after the entirety of the multilayered fibrous material block 50 is satisfactorily heated, the top die 22 is lowered to compress the multilayered fibrous material block 50 to a predetermined thickness (bulk density). At this stage, it is desired that the top die 22 has been heated to approximately the same temperature as that of the multilayered fibrous material block 50. This is for the following reason. If the temperature of the top die 22 is lower than the melting point of the polyethylene which acts as adhesive, the polyethylene in the topmost portion of the multilayered fibrous material block 50 solidifies, causing the fibers to be welded to the adjacent fibers. As a result, such a problem occurs that the bulk density of the top portion of the multilayered fibrous material block 50 becomes locally high; the bulk density of the top portion of the multilayered fibrous material block 50 becomes undesirably higher than that of the rest.

In this compressing process, the heated air flow is not stopped, and therefore, the multilayered fibrous material block 50 is compressed while the gravity acting on each fiber is being cancelled by the flow. As a result, the multilayered fibrous material block 50 is compressed while maintaining uniform bulk density throughout its entirety. As the multilayered fibrous material block 50 is compressed, the bulk density of the multilayered fibrous material block 50 gradually increases, making it more difficult for the heated air to pass through the multilayered fibrous material block 50, and for heat to conduct through the multilayered fibrous material block 50. Thus, it is desired that while compressing the multilayered fibrous material block 50, the heated air flow is slightly reduced. This is for the following reason. As the bulk density increases, the increased bulk density decreases the ventilability and thermal conductivity of the multilayered fibrous material block 50, which in turn causes the entirety of the multilayered fibrous material block 50 to be blown upward and pressed against the top die 22 by the heated air flow, resulting in the problem that the bulk density of the top portion of the multilayered fibrous material block 50 locally increases, or the like problems. In this embodiment, the velocity of the heated air flow in the compressing process was set to 0.2–0.4 m/sec.

As for the compression speed (the speed at which the top die 22 in this embodiment is lowered), it matters very little when it is intended to obtain a fibrous aggregate block with high bulk density (0.15 g/cm$^3$ or more). However, when it is intended to obtain a fibrous aggregate block with a low bulk density, it is desired that the multilayered fibrous material block 50 is compressed at a slower speed. This is for the following reason. If the compression speed is high, before the entirety of the multilayered fibrous material block 50 is compressed, the bulk density of the multilayered fibrous material block 50 increases on the side in contact with the top die 22, and the fibers on this side are welded to each other while the bulk density of this side remains high. As a result, the problem that the bulk density of the top portion locally increases, or the like problems, occur.

Obviously, it is desired that also during the compressing process, the top die 22 is lowered from straight above while keeping afloat the multilayered fibrous material block 50 by blowing the heated air upward from directly below the multilayered fibrous material block 50.

(1-4) Cooling Process

After compressing the multilayered fibrous material block 50 to the predetermined thickness, the top and bottom dies 22 and 21 are removed from the heating chamber 10, with the multilayered fibrous material block 50 remaining compressed between the two dies, and the entirety of the two dies 22 and 21 and the multilayered fibrous material block 50 is cooled. During this cooling period, the top die 22 may be kept pressed toward the bottom die 21 with the use of a weight or the like, with a spacer (unillustrated) with a predetermined height being placed between the top and bottom dies 22 and 21, so that the state in which the multilayered fibrous material block 50 has been kept compressed in the heating chamber 10 can be exactly maintained during the cooling period. As for the cooling method, any method will do: natural cooling, forced cooling by a cooling fan or the like. Further, the cooling may be done within the heating chamber 10; the interior of the heating chamber 10 is cooled without removing the top and bottom dies 22 and 21 from the heating chamber 10.

After the temperatures of the surface layers of the multilayered fibrous material block 50, that is, the temperatures of the top and bottom surfaces of the multilayered fibrous material block 50 in contact with the top and bottom dies 22 and 21, respectively, drop below the melting point of the polyethylene, the multilayered fibrous material block 50 is separated from the top and bottom dies 22 and 21, with the perforated sheets 23 and 25 remaining with the multilayered fibrous material block 50. At this stage, the multilayered fibrous material block 50 has already turned into the multilayered fibrous aggregate block 55 (FIG. 9), that is, the multilayered fibrous material block 50 is practically the same as the fibrous aggregate block 55, although the perforated sheets 23 and 25 are still firmly in contact with the multilayered fibrous material block 50 at this stage. Thus, after the cooling process, the multilayered fibrous material block 50 will be referred to as the fibrous aggregate block 55.

Figure 8:
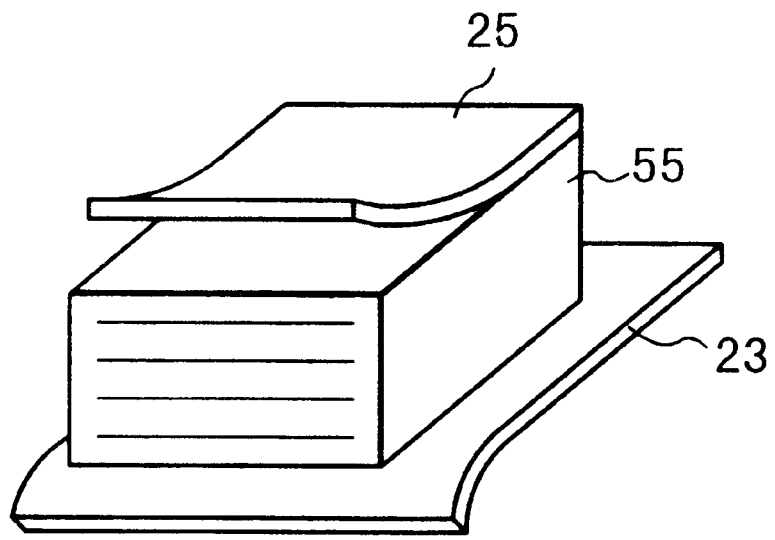
FIG. 8 is a schematic drawing for depicting a method for forming a block of fibrous aggregate using the heating chamber illustrated in FIG. 1, and shows the state in which the ventilatory sheets are being peeled away after the completion of the compressing process and cooling process.
Figure 9:
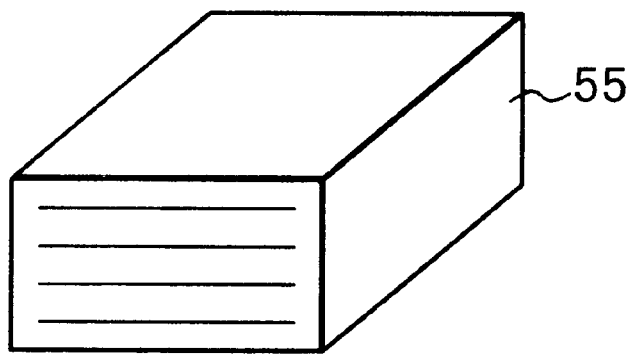
FIG. 9 is a perspective view of the block of fibrous aggregate formed with the use of the heating chamber illustrated in FIG. 1.

After the separation of the top and bottom dies 22 and 21 from the fibrous aggregate block 55, the perforated sheets 23 and 25 are peeled from the fibrous aggregate block 55 as shown in FIG. 8 to obtain the fibrous aggregate block 55 in the state depicted in FIG. 9.

By going through each of the above described processes, the fibrous aggregate block 55 with an apparent specific weight of 0.038–0.043 g/cm$^3$ and a thickness of 35 mm can be formed. The obtained fibrous aggregate block 55 is cut into smaller pieces of a predetermined size, or used in combination with other fibrous aggregate block 55, depending on usage.

In the above description of this embodiment, the case in which the fibrous aggregate block 55 having the aforementioned apparent specific weight and the aforementioned thickness was formed using such sheathed fiber that has a polypropylene core and a polyethylene sheath, was stated. However, various manufacturing conditions such as the aforementioned internal temperature setting of the heating chamber 10 or velocity of the heated air flow are adjusted in accordance with the type, thickness, and physical properties of the fibrous aggregate block to be formed. According to the method used in this embodiment, a thick and uniform block of fibrous aggregate 55 having a bulk density ranging between 0.03–0.3 g/cm$^3$, can be produced using a block of multilayered fibrous material 50 having a bulk density of approximately 0.02 g/cm$^3$.

The thus formed fibrous aggregate block 55 possesses a proper amount of elasticity, and therefore, can be used as a preferable interior material for a seat, an armrest, a headrest, and the like for a passenger car, or a preferable cushioning material for such furniture that is represented by a bed and a sofa. Further, the fibrous aggregate block 55 is superior in water retention, and therefore, can be used as a preferable material for a water retaining member placed in various liquid containers in which various liquids are kept.

The fiber aggregate comprising fibers welded at the crossing points of fibers is advantageous over aggregated of non-welded fibers as follows.

When the aggregate is used as a cushion, the shape may be lost relatively easily, and the cushion performance varies since the fibers slide in response to the external pressure relative to each other because the fibers are not fixed to each other at the crossing points. According to the present invention, the positional relationships among the fibers hardly changes even by pressure, and therefore, the shape can be maintained, and the cushion performance can be maintained.

Furthermore, according to the present invention, a welded fiber aggregate having a low bulk density and a large thickness can be provided. The low limit of the density changes with the diameter (denier) of the fiber. Generally, the difficulty of production becomes greater with increase of the thickness. According to the present invention, such a low density fiber aggregate as 0.025 g/cm$^3$ with the thickness of 45 mm or 0.03 g/cm$^3$ with the thickness of 60 mm could be produced. With conventional methods, it has been difficult to produce the aggregate of 0.06 g/cm$^3$ in density. According to the present invention, the fiber aggregate having the density of not less than 0.03 g/cm$^3$ can be easily produced when the thickness is not less than 15 mm and not more than 60 mm. Such a low density fiber aggregate is advantageous in that the degree of deformation against the pressure is large, and therefore, it can be used as a sheet for a car or cushions for furniture, or packing materials particularly for ornaments of precious metal, jewels, fragile materials or the like, for which cushion of less elasticity and high restoring performance is desired.

As described above, according to the fibrous aggregate forming method in this embodiment which employs the heating heating chamber 10, heated air is blown upward at the multilayered fibrous material block 50, which has not been compressed, from below the multilayered fibrous material block 50 during the heating process, and therefore, the heated air smoothly climbs through the multilayered fibrous material block 50 while exchanging heat with the multilayered fibrous material block 50, efficiently heating the multilayered fibrous material block 50 and therefore reducing the heating time. Consequently, a thick block of fibrous aggregate which is low in bulk density can be formed.

At this time, the description of the perforated sheets 23 and 25 will be supplemented.

As described before, the perforated sheet 23 on the bottom side effectively contributes to produce a thick sheet of fibrous aggregate block 55 which is low and uniform in bulk density, by preventing the multilayered fibrous material block 50 from becoming separated from the bottom die 21 during the heating process. When only this aspect of the fibrous aggregate production is taken into consideration, the perforated sheet 25 on the top side is unnecessary. However, the perforated top sheet 25 contributes to preventing the top surface of the multilayered fibrous material block 50 from being disturbed while the multilayered fibrous material block 50 is kept afloat and heated, and also to prevent such a phenomenon that an unintended bulk density distribution is created in the multilayered fibrous material block 50 by the sudden conduction of heat from the heated top die 22. In addition, in consideration of the compressing process, which comes after the heating process, and in which the multilayered fibrous material block 50 is compressed by the top and bottom dies 22 and 21 while polyethylene is in the melted state, if the perforated sheets 23 and 25 are not used, the textures of the surfaces of the top and bottom dies 22 and 21 are imprinted onto the multilayered fibrous material block 50, and as a result, the top and bottom surface layers of the multilayered fibrous material block 50 are turned into the so-called skin layers. The interposition of the perforated sheets 23 and 25 between the two members used for compressing the multilayered fibrous material block 50 is effective to prevent the formation of these skin layers.

As is evident from the above description, the material for the perforated sheets 23 and 25 is desired to be such a material that is capable of sufficiently entangling with the fibers of the multilayered fibrous material block 50, is capable of stretching or shrinking in the heated environment, and does not melt during the heating process. Further, since the textures of the surfaces of the perforated sheets 23 and 25 are imprinted, to no small extent, on the surfaces of the multilayered fibrous material block 50, the material sheet for the perforated sheets 23 and 25 is desired to be such a material sheet that is similar to the inner portion of the multilayered fibrous material block 50 in terms of the porosity. Thus, in this embodiment, a foamed polyurethane sheet with a cell count of approximately 16/cm was used as the material sheet for the perforated sheets 23 and 25.

Materials in the form of a sheet, for example, a sheet of foamed polyurethane, produced by removing cell membranes after foaming, are not much different from the multilayered fibrous material block in terms of local difference in air-flow resistance at the cell level (approximately 300–600 μm) between the areas with high air-flow resistance and the areas with low air-flow resistance. Depicted two dimensionally, the multilayered fibrous material can be compared to a large room formed by removing all the walls of a plurality of contiguous small rooms (pillars can be compared to fibers). However, if the cells of the urethane sponge are compared to the rooms of a building, the rooms are different in size (cell size). In addition, some of the walls have been removed, but the other have not been removed, hindering the traffic through the building (increasing air-flow resistance). Positioning a sheet of foamed material, as the ventilatory sheet, in contact with the top or bottom surface of the multilayered fibrous material provides an effect of rectifying air flow across the entire surface through which the heated air flows.

Generally speaking, synthetic fibers are coated with various oily substances to provide them with convergence and smoothness, to prevent static electricity generation, or the like purposes; oily substances are adhered to them during a spinning process. However, in the fields of medicine or precise machinery, the oily substances are extremely disliked in some cases. In such cases, the amount of the oily substances must be reduced to an extremely low level. If the present invention is applied to such fibers, various problems that fibers entangle among themselves in an unintended manner, that bulk density becomes disturbed, and the like, occur sometimes in the presence of static electricity. Thus, it is desired as a countermeasure to such problems that the entirety of the webs are subjected to discharging blow when manufacturing fibrous aggregate. Further, a process in which ion exchange water or a water solution of nonionic surfactant is sprayed onto fibers may be provided in addition to the discharging blow process. The addition of such a process may be also very effective.

Embodiment 2

Figure 10:
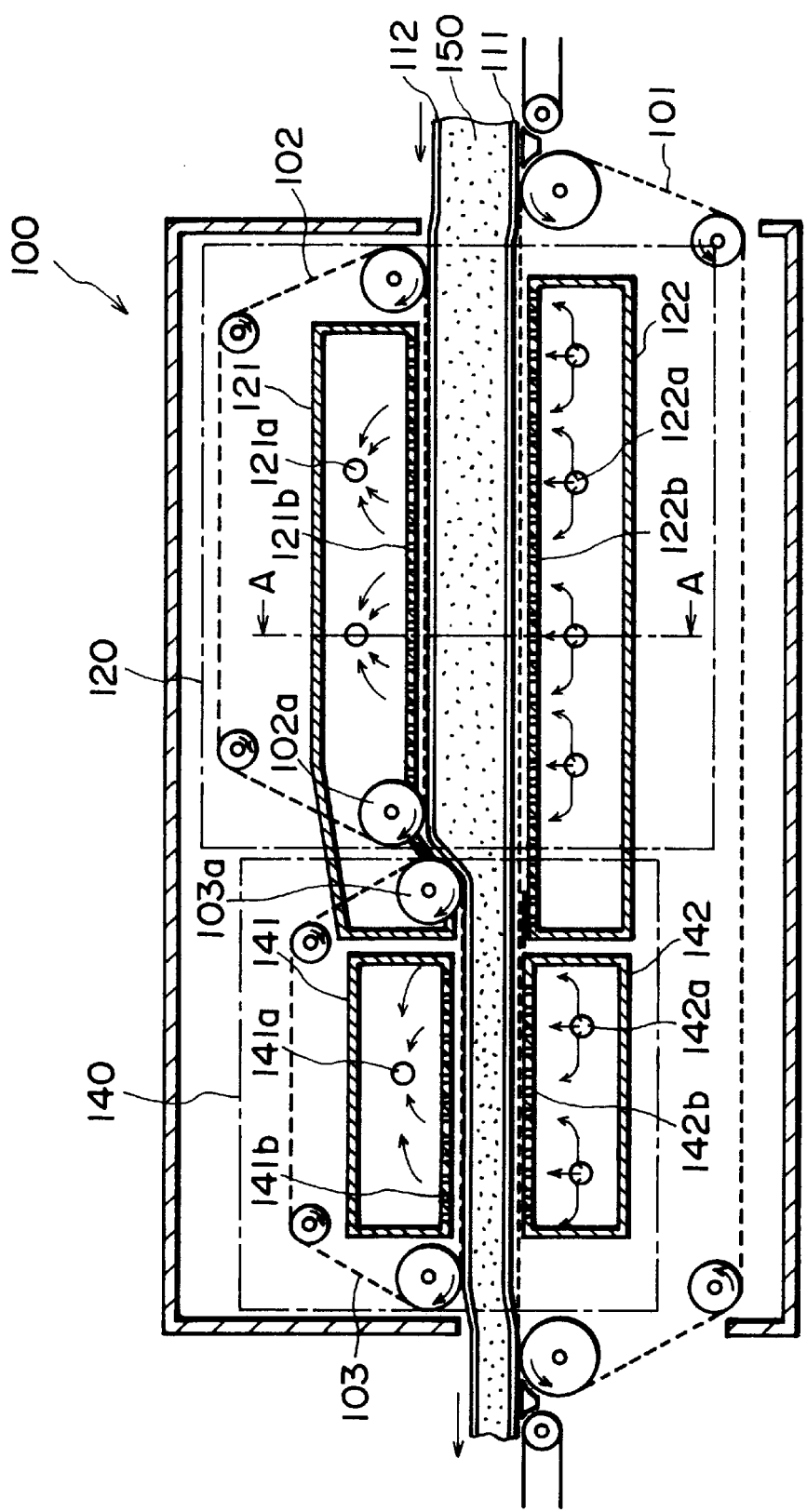
FIG. 10 is a schematic sectional view of the a fibrous aggregate forming apparatus in the second embodiment of the present invention.
Figure 11:
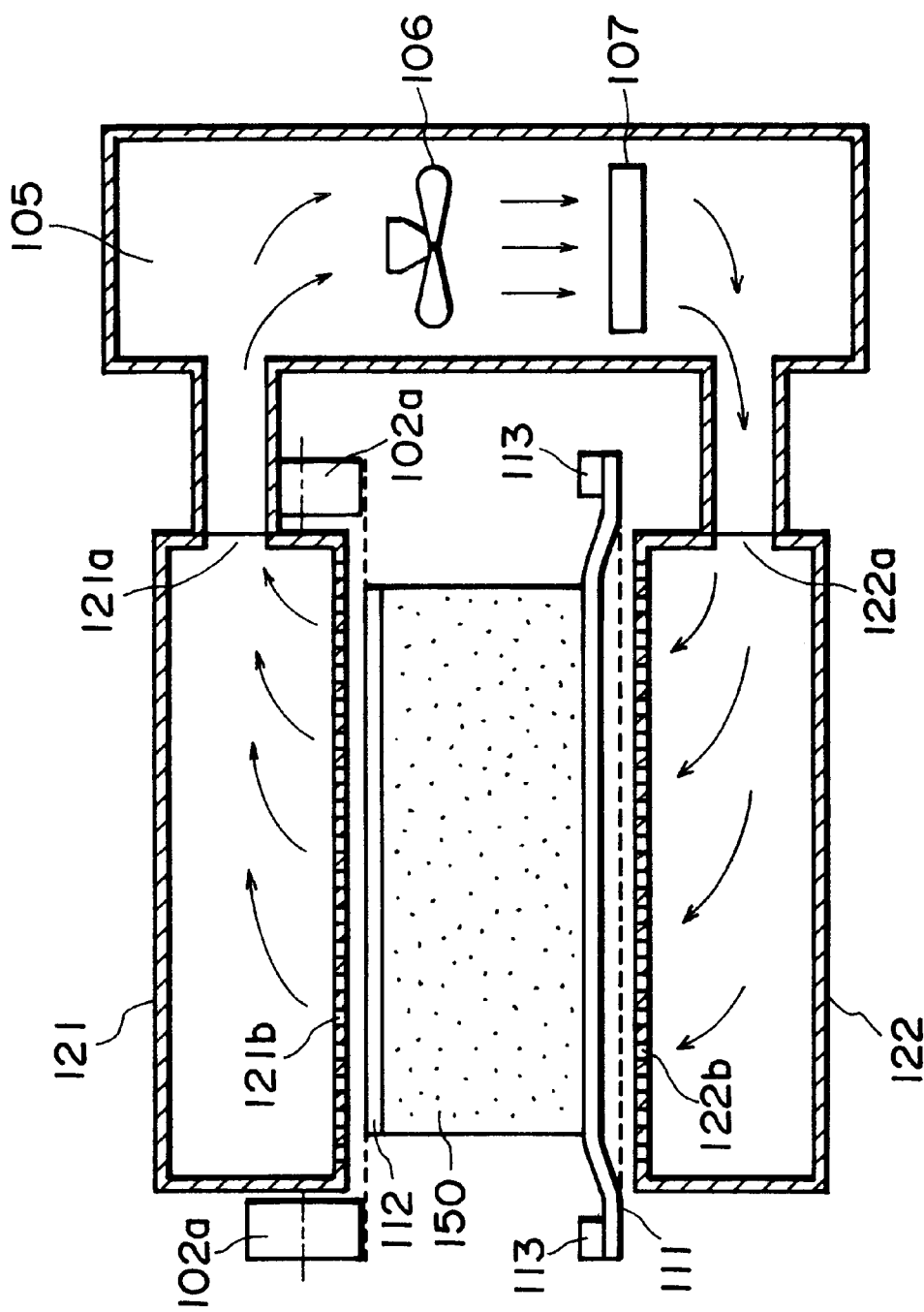
FIG. 11 is a schematic sectional view of the fibrous aggregate forming apparatus illustrated in FIG. 10, at a plane indicated by a line A—A.
Figure 12:
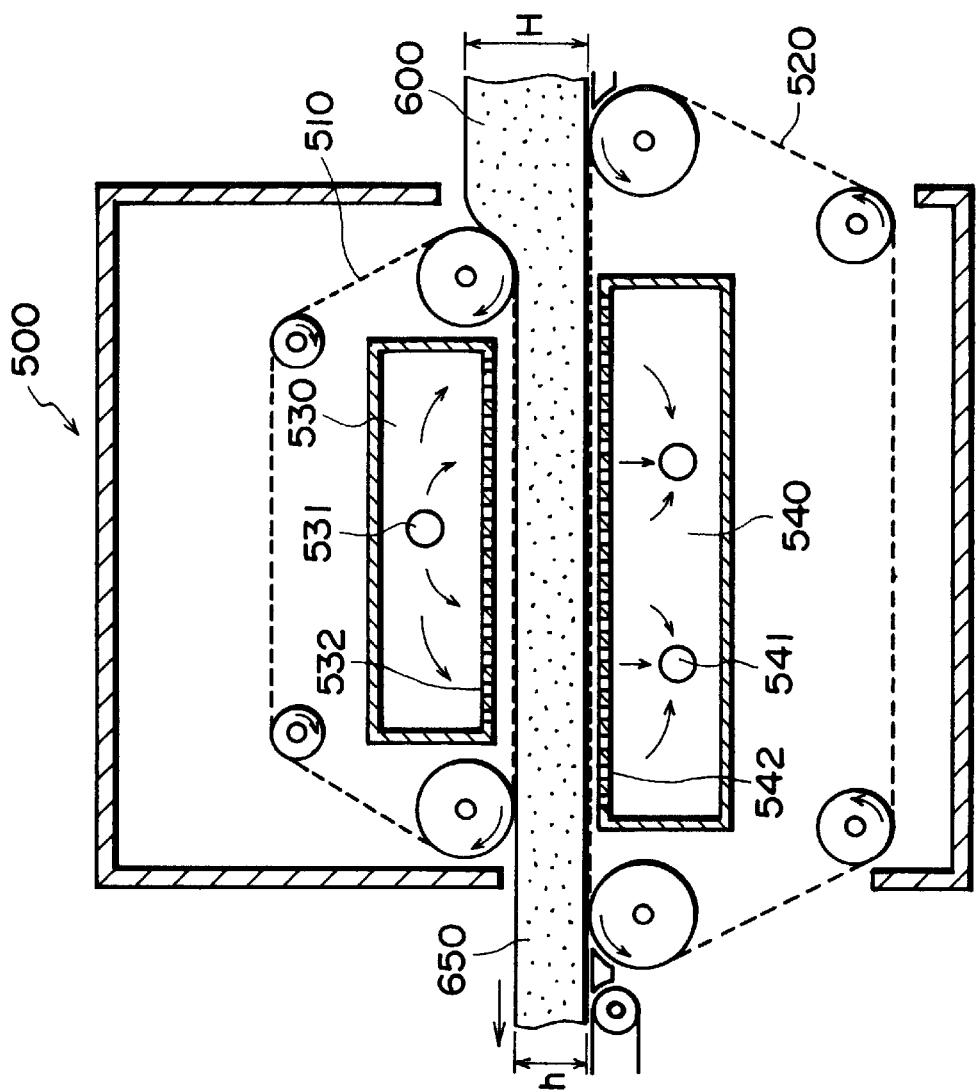
FIG. 12 is a schematic sectional view of a conventional heated air conveyer heating chamber used for a thermal molding method.

FIG. 10 is a schematic sectional view of the fibrous aggregate forming apparatus in the second embodiment of the present invention, and FIG. 11 is a schematic sectional view of the apparatus illustrated in FIG. 10, at a plane indicated by a line A—A in FIG. 10.

In the fibrous aggregate forming apparatus in this embodiment, fibrous aggregate is formed by moving a unit of continuous multilayered fibrous material 150 sandwiched by ventilatory sheets 111 and 112 from the top and bottom sides, from the right side of the drawing to the left side, with the use of first to third mesh belts 101, 102, and 103, in the housing of the heating heating chamber 100.

The first mesh belt 101 is in the bottom side of the heating chamber 100. The first mesh belt 101 extends across the entire range through which a unit of continuous multilayered fibrous material 150 is moved. After being fed into the heating chamber 100, the unit of continuous multilayered fibrous material 150 is carried on the first mesh belt 101 and moved in the left direction indicated in the drawing through the heating chamber 100, and then is discharged from the heating chamber 100. Regarding the direction in which the unit of continuous multilayered fibrous material 150 is moved, a feeding conveyer is located on the upstream side of the first mesh belt 101, and a discharging belt is located on the downstream side of the first mesh belt 101. The vertical level at which the first mesh belt 101 conveys the unit of continuous multilayered fibrous material 150 coincides with the vertical levels at which the feeding and discharging conveyers convey the unit of continuous multilayered fibrous material 150. With the provision of this arrangement, the unit of continuous multilayered fibrous material 150 can be smoothly transferred onto the first mesh belt 101 from the feeding conveyer, and then can be smoothly transferred out onto the discharging conveyer from the first mesh belt 101; in other words, the unit of continuous multilayered fibrous material 150 can be continuously moved. As for a preferable material for the first mesh belt 101, there is a metallic belt with an approximately mesh number of 4 mesh/cm, for example.

The unit of continuous multilayered fibrous material 150 is fed into the heating chamber 100, with its bottom and top surfaces being covered with ventilatory sheets 11 and 112 which are placed in contact with the corresponding surfaces. Referring to FIG. 11, the ventilatory sheet 111 placed in contact with the bottom surface of the unit of continuous multilayered fibrous material 150 is wider than the unit of continuous multilayered fibrous material 150, and the opposing edge portions of the ventilatory sheet 111 extending beyond the corresponding edges of the unit of continuous multilayered fibrous material 150 are held to the first mesh belt 101 with the use of anchoring members 113. The width of the ventilatory sheet 112 placed on top of the unit of continuous multilayered fibrous material 150 is the same as that of the unit of continuous multilayered fibrous material 150. The material and structure of the unit of continuous multilayered fibrous material 150, and the materials and structures of the ventilatory sheets 111 an 112, in this embodiment, are the same as those in the first embodiment.

The interior of the heating chamber 100 has two separate sections: a heating section 120 on the upstream side, and a cooling section 140 on the downstream side, in terms of the direction in which the unit of continuous fibrous material 150 is moved.

First, the heating section will be described. The heating section 120 has the second mesh belt 102, which is positioned above the first mesh belt 101 in a manner to oppose the first mesh belt 101. The second mesh belt 102 is rotated at the same velocity as that of the first mesh belt 101 and in synchronism with the first mesh belt 101. It guides the unit of continuous multilayered fibrous material 150, directly bearing down on the ventilatory sheet 112, as the unit of continuous multilayered fibrous material 150 is moved by the first mesh belt 101. The second mesh belt 102 is vertically movable by an elevating mechanism (unillustrated), for example, a hydraulic cylinder or the like, and its distance from the first mesh belt 101 has been adjusted to be greater than the thickness of the unit of continuous multilayered fibrous material 150 inclusive of the ventilatory sheets 111 and 112, so that the top surface of the unit of continuous multilayered fibrous material 150 comes into contact with the second mesh belt 102 only when the unit of continuous multilayered fibrous material 150 is made airborne above the first mesh belt 101. As for the preferable material for the second mesh belt 102, there is metallic belt with an approximate mesh number of 4 mesh/cm, for example.

There are a first air sending chamber 122 and a first air receiving chamber 121 a certain distance below and above, respectively the passage through which the unit of continuous multilayered fibrous material 150 is moved by the first and second mesh belts 101 and 102. The first air sending chamber 122 has an air supplying holes 122a which open in the side wall of the first air sending chamber 122, and a large number of perforations 122b which are in the top wall of the first air sending chamber 122, being evenly distributed. The structure of the first air receiving chamber 121 is similar to that of the first air sending chamber 122; air suctioning holes 121a are in the side wall, and a large number of perforations 121b are in the bottom wall, being evenly distributed. Referring to FIG. 10, a pair of conveyer rollers 102a around which the second mesh belt 102 is suspended appear as if they are in the air receiving chamber 121. However, they are positioned outside the air receiving chamber, one on each side, as shown in FIG. 11, and therefore, they do not affect the heated air flow from the air supplying holes 122a which will be described later.

Referring to FIG. 11, the air suctioning holes 121a and air supplying holes 122a are connected to a heated air flow generating machine 105 by way of corresponding air ducts. The heated air flow generating machine 105 contains a heater 107, and an air blowing fan 106 which generates air flow which flows from the air suctioning hole 121a side toward the air suctioning hole 122a side. As the heated air flow generating machine 105 is driven, heated air flow which flows towards the supplying holes 122a is generated in the heated air flow generating machine 105. This heated air is sent into the air sending chamber 122 through the air supplying holes 122a, and is blown into the unit of continuous multilayered fibrous material 150 from directly below through the perforations 122b. After being blown into the unit of continuous multilayered fibrous material 150, the heated air travels upward through the unit of continuous multilayered fibrous material 150, is suctioned into the air receiving chamber 121 through the perforations 121b, and is returned into the heated air flow generating machine 105 through the air supplying holes 121a. In other words, across the range across which the unit of continuous multilayered fibrous material 150 is moved, upward flow of heated air occurs.

As will be described later, in this embodiment, in order to make it possible to allow heated air to be blown upward toward the unit of continuous multilayered fibrous material 150 even while the unit of continuous multilayered fibrous material 150 is compressed, the first air sending chamber 122 and first air receiving chamber 121 are extended into the areas below and above a pair of conveyer rollers 103a, that is, the most upstream conveyer rollers, around which the third mesh belt 103 is suspended, respectively, in the cooling section 140 which will be described later. These conveyer rollers 103a are also positioned outside the air receiving chamber 121 as the aforementioned pair of conveyer rollers 102a, and therefore, they do not affect the flow of heated air from the air supplying holes 122a.

Next, the cooling section 140 will be described. The basic structure of the cooling section 140 is the same as that of the heating section 120. In other words, it has the third mesh belt 103 which is positioned above the first mesh belt 101 in a manner to oppose the first mesh belt 101, a second air sending chamber 142 positioned below the path through which the unit of continuous multilayered fibrous material 150 is conveyed, and a second air receiving chamber 141 positioned above the path through which the unit of continuous multilayered fibrous material 150 is conveyed. However, this cooling section 140 must quickly cool the unit of continuous multilayered fibrous material 150 after the compression of the unit of continuous multilayered fibrous material 150, and therefore, a cold air flow generating machine (unillustrated), instead of the aforementioned heated air flow generating machine, is connected to the second air sending chamber 142 and second air receiving chamber 141.

The third mesh belt 103 is rotated at the same velocity as that of the first mesh belt 101 and in synchronism with the first mesh belt 101. It guides the unit of continuous multilayered fibrous material 150, bearing down on the ventilatory sheet 112, as the unit of continuous multilayered fibrous material 150 is conveyed by the first mesh belt 101. The third mesh belt 103 is vertically movable by an unillustrated elevating mechanism as is the second mesh belt 102, and its distance from the first mesh belt 101 has been adjusted so that the unit of continuous multilayered fibrous material 150 is compressed to the thickness of a final product, or a unit of continuous fibrous aggregate. A preferable material for the first mesh belt 101 is a metallic belt with an approximate mesh number of 4 mesh/cm, for example.

The second air sending chamber 142 has air supplying holes 142a and perforations 142b similar to the air supplying holes 122a and perforations 122b of the first air sending chamber 122, and the cold air generated by the aforementioned cold air flow generating machine is blown upward from below the unit of continuous multilayered fibrous material 150. The second air receiving chamber 141 has an air suctioning hole 141a and perforations 141b similar to the air supplying holes 121a and perforations 121b of the first air receiving chamber 121, and the cold air is blown upward from the second air sending chamber 142, is suctioned through the unit of continuous multilayered fibrous material 150, and is returned into the cold air flow generating machine.

As for the cooling air to be blown through the heated unit of continuous multilayered fibrous material 150 in the cooling section 140, air (ambient air) with normal temperature may be used. In such a case, the aforementioned cold air flow generating machine is structured as a simple air blower, which takes in air from outside the heating chamber 10, and exhausts it from the second air receiving chamber 141. With the provision of a blower or the like for forcefully exhausting the air within the second air receiving chamber 141, at the air sunctioning hole 141a of the second air receiving chamber 141, improvement in air exhausting efficiency can be expected.

At least one of the rollers around which the first and third mesh belts 101–103 are suspended is provided with a secondary heating means constituted of a piece of electrical heating wire or the like, and any given portions of the first to third mesh belts 101–103 are preheated to an approximately the same temperature as that necessary in the heating heating chamber 10, before they come into contact with the unit of continuous multilayered fibrous material 150.

More specifically, the temperature of a given portion of the first mesh belt 101 drops as it moves through the cooling section 140, and therefore, this portion of the first mesh belt 101 is preheated to a predetermined temperature before it enters the heating section 120, so that the efficiency with which the unit of continuous multilayered fibrous material 150 is heated in the heating section 120 is prevented from falling. The temperature of a given portion of the second mesh belt 102 also falls before it comes into contact with the unit of continuous multilayered fibrous material 150 after it becomes separated from the unit of continuous multilayered fibrous material 150, and therefore, this portion of the second mesh belt 102 is also heated to a predetermined temperature before it comes into contact with the unit of continuous multilayered fibrous material 150 again, so that the efficiency with which the unit of continuous multilayered fibrous material 150 is heated in the heating section 120 is prevented from reducing. The temperature of a given portion of the third mesh belt 103 drops as this portion of the third mesh belt 103 comes into contact with the cooling air while it is moving between the second air sending camber 142 and second air receiving chamber 141, and therefore, it is heated to a predetermined temperature before it comes into contact with the unit of continuous multilayered fibrous material 150, so that the temperature of the top portion of the compressed unit of continuous multilayered fibrous material 150 is prevented from rapidly dropping. As a result, the entirety of the unit of continuous multilayered fibrous material 150 is evenly compressed across the surfaces to the core while it is kept at the temperature to which it is heated in the heating section 120, eliminating such a problem that the unit of continuous multilayered fibrous material 150 is compressed after it begins to solidify due to the temperature drop.

Next, an example of a process, in which a unit of continuous fibrous material with an apparent bulk density of 0.038–0.043 g/cm$^3$ and a thickness of 35 mm is continuously formed of a supply of the sheathed fibers with a fineness of 2–6 deniers, with the use of the forming apparatus illustrated in FIG. 10, will be described.

(2-1) Preparatory Process

First, the unit of continuous multilayered fibrous material 150 similar to the multilayered fibrous material block 50 in the first embodiment is prepared. Then, the position of the second mesh belt 102 is adjusted; the second mesh belt 102 is vertically moved to a position at which the unit of continuous multilayered fibrous material 150 which has been sandwiched by the two ventilatory sheets 111 and 112 and mounted on the first mesh belt 101 does not make contact with the second mesh belt 102. Since the thickness of a unit of continuous fibrous aggregate into which the unit of continuous multilayered fibrous material 150 is formed is 35 mm, the position of the third mesh belt 103 is adjusted; the third mesh belt 103 is vertically moved so that the thickness of the unit of continuous multilayered fibrous material 150 becomes 35 mm in the cooling section 140. The rotational velocities of the mesh belts 101–103 are set so that the velocity at which the unit of continuous multilayered fibrous material 150 is conveyed becomes 0.5 m/min.

As for the heating section 120, a temperature to which air is heated, a velocity at which air is blown, and the like factors, are set in accordance with the physical properties of the fiber. More specifically, the unit of continuous multilayered fibrous material 150 is formed of strands of such sheathed fiber that has a core portion of polyethylene and a sheath portion of polypropylene as described before. Therefore, it is required that the unit of continuous multilayered fibrous material 150 is heated to a temperature, which is higher than the melting point of polyethylene and is lower than the melting point of polypropylene, while the unit of continuous multilayered fibrous material 150 is conveyed to the downstream end of the heating section 120. In this embodiment, the heated air temperature was set to approximately 140° C., and the heated air velocity was set to a velocity in a range of 0.3–0.8 m/sec.

As for the cooling section 140, the temperature and velocity of cooling air, and the like factors, are set based on the fact that polyethylene, that is, one of the constituents of the fiber in the unit of continuous multilayered fibrous material 150, must be cooled to a temperature lower than the melting point of polyethylene while the unit of continuous multilayered fibrous material 150 having been heated and compressed is conveyed to the downstream end of the compressing section. It is desired that the unit of continuous multilayered fibrous material 150 is uniformly cooled in terms of its thickness direction, toward the top surface (toward third mesh belt 103) starting from the bottom surface (first mesh belt 101 side). In this embodiment, therefore, the cooling air temperature was set to approximately normal temperature, and the cooling air velocity was set to a velocity in a range of 0.2–0.3 m/sec.

After the various sections are adjusted as described above, the unit of (continuous multilayered fibrous material 150 is fed into the heating chamber 100, with the unit of continuous multilayered fibrous material 150 sandwiched by the ventilatory sheets 112 and 111 from the top and bottom sides, respectively.

(2-2) Heating Process

After being fed into the heating chamber 100, the unit of continuous multilayered fibrous material 150 is first conveyed into the heating section 120. While the unit of continuous multilayered fibrous material 150 is conveyed through the heating 120, it is heated by the heated air blown upward from directly below the unit of continuous multilayered fibrous material 150. As a result, polyethylene which constitutes the sheath portion of the fiber melts, causing the fibers of the unit of continuous multilayered fibrous material 150 to be welded to each other. During this process, the unit of continuous multilayered fibrous material 150 is kept airborne above the first mesh belt 101 by the upward flow of heated air as shown in FIG. 11, the gravity acting on each fiber being cancelled by the flow. Thus, the fibers in the unit of continuous multilayered fibrous material 150 are thermally welded to each other while remaining in the same state as they were prior to the heating. The properties required of ventilatory sheets 111 and 112 are the same as those in the first embodiment, and a pair of weighting blocks 113 required in this embodiment are the same as the weighting blocks 24 required in the first embodiment. Therefore, they will not be described in detail here.

(2-3) Compressing Process

After being compressed by the first and third mesh belts 101 and 103, the unit of continuous multilayered fibrous material 150 is conveyed through the cooling section 140 while remaining compressed by the first and third mesh belts 101 and 103. In the cooling section 140, the cooling air is being blown upward from directly below the path of the unit of continuous multilayered fibrous material 150. Therefore, the unit of continuous multilayered fibrous material 150 is gradually cooled, and the polyethylene portions of the fibers solidify before the multilayered fibrous material block 50 is released from the compressing effect of the belts 101 and 103.

After being passed through the cooling section 140, the unit of continuous multilayered fibrous material 150 is discharged from the heating heating chamber 100, and the ventilatory sheets 111 and 112 are removed from the unit of continuous multilayered fibrous material 150. Consequently, a unit of continuous fibrous aggregate is obtained. The thus obtained unit of continuous fibrous aggregate is cut into a plurality of small pieces of fibrous aggregates of different sizes in accordance with usage.

As described above, according to this embodiment, the unit of continuous multilayered fibrous material 150 is mounted on a conveyer and is fed into the heating heating chamber 101, which continuously heats the unit of continuous multilayered fibrous material 150 to a predetermined temperature without compressing it, and then, continuously cools the unit of continuous multilayered fibrous material 150, while keeping it compressed, immediately after the heating. Therefore, a unit of continuous fibrous aggregate, which has a predetermined bulk density and a predetermined thickness, can be continuously formed. The effect of keeping the unit of continuous multilayered fibrous material 150 airborne by blowing heated air upward from directly below the unit of continuous multilayered fibrous material 150, and the effect of placing a ventilatory sheet in contact with at least the bottom surface of the unit of continuous multilayered fibrous material 150, are the same as those in the first embodiment.

In another embodiment of the present invention, a plurality of pairs of the top and bottom dies used in the first embodiment, and a heating heating chamber capable of continuously moving the plurality of the pairs of the top and bottom dies, are used to form a unit of continuous fibrous aggregate. The preparatory process in this embodiment is the same as that in the above described first embodiment, and therefore, will not be described here. Thus, the details of the heating process, compressing process, and cooling process in this embodiment will be described below.

Embodiment 3

In this embodiment of the present invention, a unit of continuous fibrous aggregate is formed by preparing plural pairs of the top and bottom dies used in the first embodiment of present invention, and a heating heating chamber capable of continuously moving the plural pairs of the top and bottom dies.

(3-1) Preparatory Process

The preparatory process in this embodiment is the same as that in the above described first embodiment, and therefore, its details will not be described here, and the details of the heating, compressing, and cooling processes in this embodiment will be described below.

(3-2) Heating Process

A multilayered fibrous material block 50 is placed on each of the bottom dies 32 in the first embodiment. At this stage, the position of the top die 22 is such that a gap is present between the top die 22 and the ventilatory sheet 5 on the top side. The interior of the heating chamber has been preheated to a desired temperature by a heater 12. In this state, the bottom die 21 on which the multilayered fibrous material block 50 is resting, and the top die 22 set on the multilayered fibrous material block 50, are moved into the heating chamber. The heating chamber contains a moving means for moving the top and bottom dies 22 and 21. In the heating chamber, the distance between the bottom and top dies 21 and 22 is maintained at a desired distance by this die moving means. The distance between the bottom and top dies can be optionally set. As described before, the plural pairs of top and bottom dies are prepared, and are sequentially moved through the heating chamber. The size (length) of the heating chamber is determined in accordance with the required heating time and die moving speed. Since the method for heating the multilayered fibrous material block 50 in the heating chamber is the same as that in the above described embodiment, its description will not be given here.

(3-3) Compressing Process

After the entirety of the multilayered fibrous material block 50 is heated in the above described heating heating chamber, each of the above described top dies 22 is lowered to compress the multilayered fibrous material block 50 to a desired thickness (bulk density). Each bottom dies 21 is provided with a spacer with a desired height, as was the bottom die 21 in the first embodiment, and each top die 22 is lowered until it comes into contact with the spacer. The aforementioned top die 22 moving means can be vertically moved in this compressing zone. Each top die 22 has been heated to virtually the same temperature as that of the multilayered fibrous material block 50 while being moved through the heating heating chamber by the aforementioned die moving means, as in the first embodiment.

Also in this compressing process, heating air is not stopped as in the first embodiment, and therefore, the multilayered fibrous material block 50 is compressed while the gravity acting upon each fiber is being cancelled by the flow of the heated air. It is obvious that also in this compressing process, it is desired that the top die 22 is lowered from above the multilayered fibrous material block 50 while the multilayered fibrous material block 50 is kept afloat by the upward flow of heated air from directly below the multilayered fibrous material block 50.

(3-4) Cooling Process

After being compressed to a desired thickness, the top and bottom dies 22 and 21 remaining compressing the multilayered fibrous material block 50 are moved out of the heating heating chamber by the above described moving means, and are cooled in entirety while being kept in the same state as the state in which they were moved out of the heating chamber. As for the cooling method, they may be naturally cooled, or may be forcefully cooled with the use of a cooling fan or the like; any cooling means may be employed as the cooling means for this embodiment. After at least the temperature of the surface layer of the multilayered fibrous material block 50, that is, the surfaces of the multilayered fibrous material block 50 in contact with the top and bottom dies 22 and 21 falls below the melting point of polyethylene, the top die 22 is moved upward, and the multilayered fibrous material 50 is moved out of the bottom die 21. At this stage, the multilayered fibrous material block 50 is still firmly in contact with the ventilatory sheets 23 and 25. In reality, however, the multilayered fibrous material block 50 is the same as the same as the multilayered fibrous material block 55 (FIG. 9). According to this embodiment, after the multilayered fibrous material block 50 is taken out, the next multilayered fibrous material block 50 may be set to repeat the heating-compressing-cooling processes, so that it appears as if a large number of fibrous aggregate blocks are continuously produced. The structures in this embodiment other than those described above, and their effects, are the same as those in the above described embodiment. Further, as described above, also in the cases of the structures in this embodiment, a large number of fibrous aggregate blocks can be efficiently produced. The size of the apparatus, and the number of the pair of top and bottom dies, should be determined in accordance with the heating time, compressing time, and cooling time for the multilayered fibrous material block 50, and the speed at which the multilayered fibrous material block 50 is moved.

While the invention has been described with reference to the structures disclosed herein, it is not confined to the details set forth, and this application is intended to cover such modifications or changes as may come within the purposes of the improvements or the scope of the following claims.

What is claimed is:

1. A forming method for a fiber aggregate in which fibers are heated to be welded with each other, said method comprising the steps of:

applying upward heated air to a bottom of a block of the fibers to pass the heated air therethrough and to cause the block of fibers to float, wherein at least parts of fibers are melted while the block of fibers float;

compressing substantially in a vertical direction the heated block of fibers into a desired height; and cooling the compressed block of fibers to solidify melted portions of the fibers at portions where the fibers intersect with each other.

2. A method according to claim 1, wherein the block of fibers includes stacked layers of fibers in which the fibers extend substantially in the same direction.

3. A method according to claim 1, wherein in said compression step, the upward heated air is applied to the bottom of the block of the fibers to pass the heated air through the block of fibers.

4. A method according to claim 3, wherein in said compression step, the block of the fibers is caused to float by the upward heated air.

5. A method according to claim 3, wherein a speed of the hot air is lower in said compression step than in said heating step.

6. A method according to claim 3, wherein said compression step is carried out with use of pressing members which have been heated before they are brought into contact to the block of fibers.

7. A method according to claim 1, further comprising a preparatory step of placing, before said heating step, the block of fibers on an air-permeative supporting member with an air permeative sheet interposed therebetween, with the air permeative sheet being engaged with the block of fibers.

8. A method according to claim 7, wherein the air-permeative sheet is fixed on the supporting member at least at a part thereof, and in said heating step, the block of the fibers floats away from the supporting member while the block of fibers is on the air-permeative sheet.

9. A method according to claim 7, wherein said preparatory step includes a step of placing an air-permeative sheet on a top of the block of fibers.

10. A method according to claim 7, wherein the air-permeative sheet has a melting point which is higher than that of the fibers.

11. A method according to claim 7, wherein the air-permeative sheet is expendable in said heating step.

12. A method according to claim 7, wherein the air-permeative sheet is made of a foam material having a porosity which is similar to that of the block of fibers.

13. A method according to claim 7, further comprising a separation step of separating the air-permeative sheet from the block of fibers after said cooling step.

14. A method according to claim 1, wherein the fibers are each made of first and second materials having different melting points, and the heated air passing through the block of fibers in said heating step has a temperature which is higher than a melting point of the first material and which is higher than a softening point of the second material but is lower than a melting point of the second material.

15. A method according to claim 14, wherein the fibers are an olefin resin material.

16. A forming method according to claim 1, wherein said heating step fuses and fixes at least a part of the fibers.

17. A forming method according to claim 1, wherein said compilation step is carried out while hot air is passing through the block of fibers.

* * * * *

UNITED STATES PATENT AND TRADEMARK OFFICE
CERTIFICATE OF CORRECTION

PATENT NO. : 6,641,763 B2
DATED : November 4, 2003
INVENTOR(S) : Masao Nakamura et al.

Figure 13:
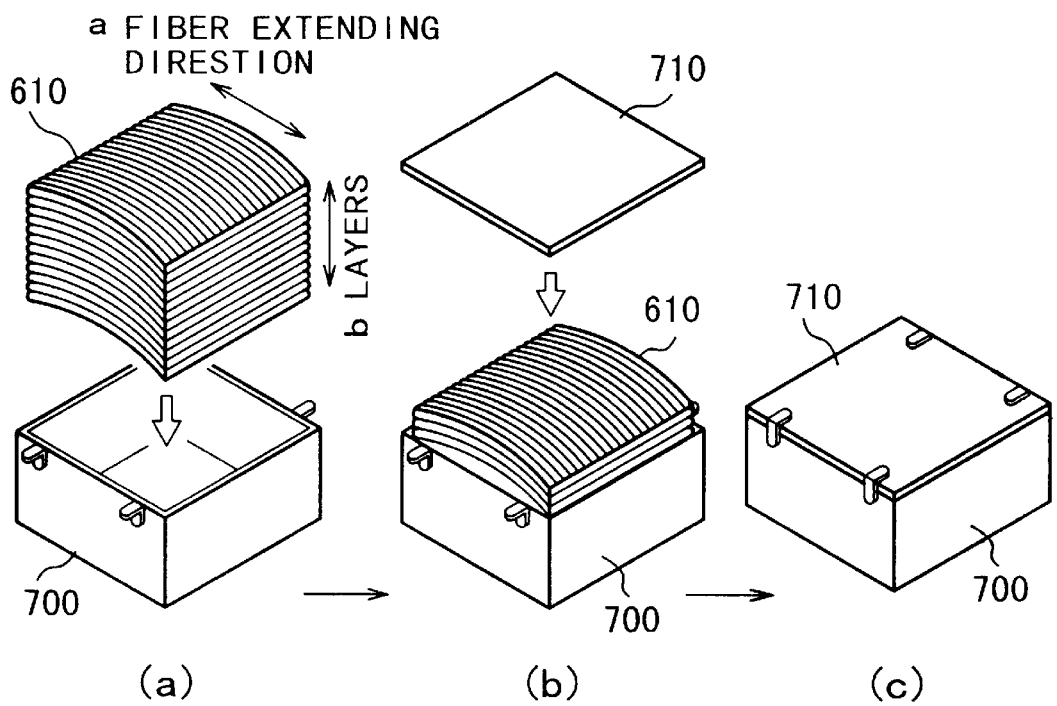
FIG. 13 is a drawing for depicting a method for forming a block of fibrous aggregate using a conventional mold based method.
Figure 14:
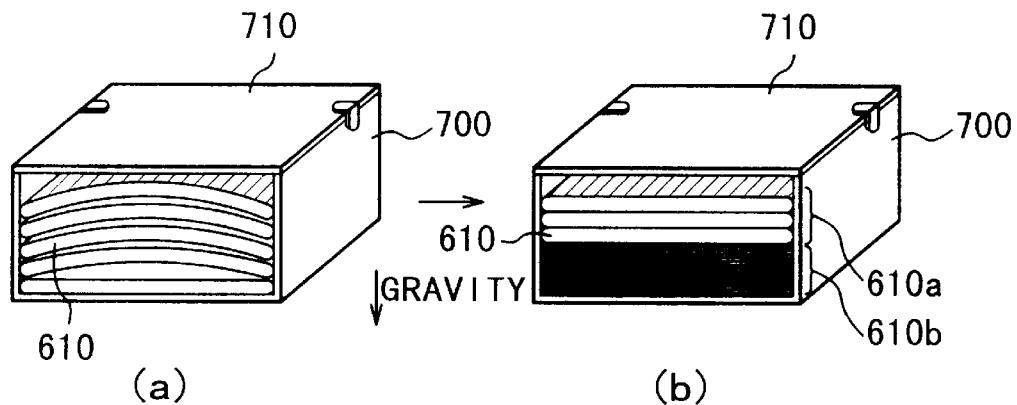
FIG. 14 is a drawing for describing the problems in a conventional mold based fibrous aggregate forming method.

It is certified that error appears in the above-identified patent and that said Letters Patent is hereby corrected as shown below:

Drawings,
Sheet 9, FIG. 13, "DIRESTION" should read -- DIRECTION --.

Column 2,
Line 9, "that" should read -- than --.

Column 7,
Line 57, "fiber" should be deleted.

Column 8,
Line 11, "stand" should read -- strand --.
Line 66, "heating" should be deleted.

Column 9,
Lines 8 and 16, "the heating" should read -- the --.
Line 56, "stands" should read -- strands --.

Column 14,
Line 11, "heating chamber" should read -- chamber --.

Column 16,
Line 13, "sheets 11" should read -- sheets 111 --.

Column 17,
Line 17, "suctioning" should read -- supplying --.
Line 29, "supplying" should read -- suctioning --.

Column 18,
Line 20, "supplying" should read -- suctioning --.
Line 35, "sunctioning" should read -- suctioning --.
Line 44, "the heating" should read -- the --.
Line 67, "camber" should read -- chamber --.

Column 20,
Lines 48 and 57, "the heating" should read -- the --.

UNITED STATES PATENT AND TRADEMARK OFFICE
CERTIFICATE OF CORRECTION

PATENT NO. : 6,641,763 B2
DATED : November 4, 2003
INVENTOR(S) : Masao Nakamura et al.

It is certified that error appears in the above-identified patent and that said Letters Patent is hereby corrected as shown below:

Column 21,
Line 8, "a heating" should read -- a --.
Lines 21 and 55, "heating heating" should read -- heating --.
Line 58, "dies" should read -- die --.
Line 66, "the heating"should read -- the --.

Column 22,
Line 13, "the heating" should read -- the --.
Line 29, "the same as" should be deleted.

Column 23,
Line 6, "of the" should read -- of --.

Column 24,
Line 5, "expendable" should read -- expandable --.

Signed and Sealed this

Third Day of August, 2004

JON W. DUDAS
*Acting Director of the United States Patent and Trademark Office*